United States Patent [19]
De Santis

[11] Patent Number: 5,274,627
[45] Date of Patent: Dec. 28, 1993

[54] NON-REGENERATIVE MULTIBEAM SATELLITE COMMUNICATIONS SYSTEM WITH FDMA ACCESS AND SSTDM CONNECTIVITY

[75] Inventor: Pietro De Santis, Rockville, Md.

[73] Assignee: International Telecommunications Satellite Organization

[21] Appl. No.: 727,771

[22] Filed: Jul. 10, 1991

[51] Int. Cl.$^5$ .............................. H04J 1/10; H04J 4/00
[52] U.S. Cl. .................. 370/49.5; 370/58.1; 370/70; 370/109; 370/50
[58] Field of Search ............ 370/18, 50, 54, 58.1, 370/58.2, 58.3, 63, 69.1, 70, 95.3, 104.1, 49.5, 109; 340/825.79; 455/12, 20, 22, 72; 381/29, 31, 34

[56] References Cited

U.S. PATENT DOCUMENTS

| | | | |
|---|---|---|---|
| 4,304,000 | 12/1981 | Bonnerot et al. | 370/50 |
| 4,495,615 | 1/1985 | Wilcke | 370/58.1 |
| 4,567,591 | 1/1986 | Gray et al. | 370/109 |
| 4,704,715 | 11/1987 | Shibagaki et al. | 370/50 |
| 4,718,058 | 1/1988 | Van Vugt | 370/58.1 |
| 4,845,704 | 7/1989 | Georgiou et al. | 370/58.1 |
| 4,858,225 | 8/1989 | DeSantis | 370/50 |
| 4,901,310 | 2/1990 | Ichiyoshi | 370/70 |
| 4,928,272 | 5/1990 | Ohue | 370/70 |
| 4,975,771 | 12/1990 | Kassatly | 370/109 |
| 5,038,344 | 8/1991 | Kawamura | 370/50 |

Primary Examiner—Douglas W. Olms
Assistant Examiner—Alpus H. Hsu
Attorney, Agent, or Firm—Sughrue, Mion, Zinn, Macpeak & Seas

[57] ABSTRACT

An apparatus and method for a non regenerative multibeam communications system with FDMA access and SSTDM connectivity. In accordance with the present invention, FDM input signals are transformed into corresponding TDM input signals. The TDM input signals are matrix switched and routed along the desired output transmission path(s). The TDM input signals routed along each output transmission path are then transformed into corresponding FDM output signals prior to further processing or transmission. The apparatus and method make it possible to provide full interconnectivity using time domain processing in a FDMA/FDM system.

38 Claims, 9 Drawing Sheets

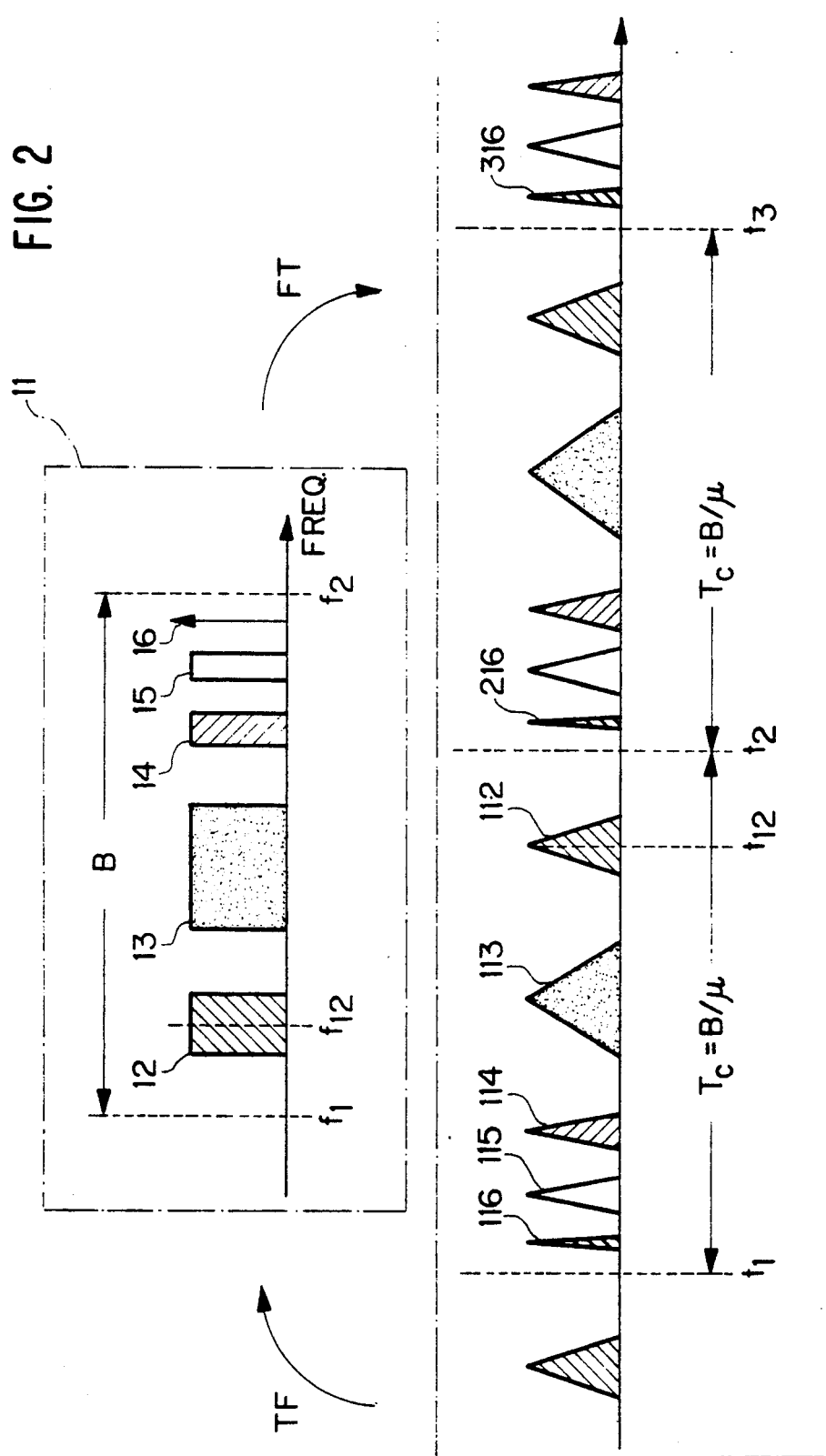

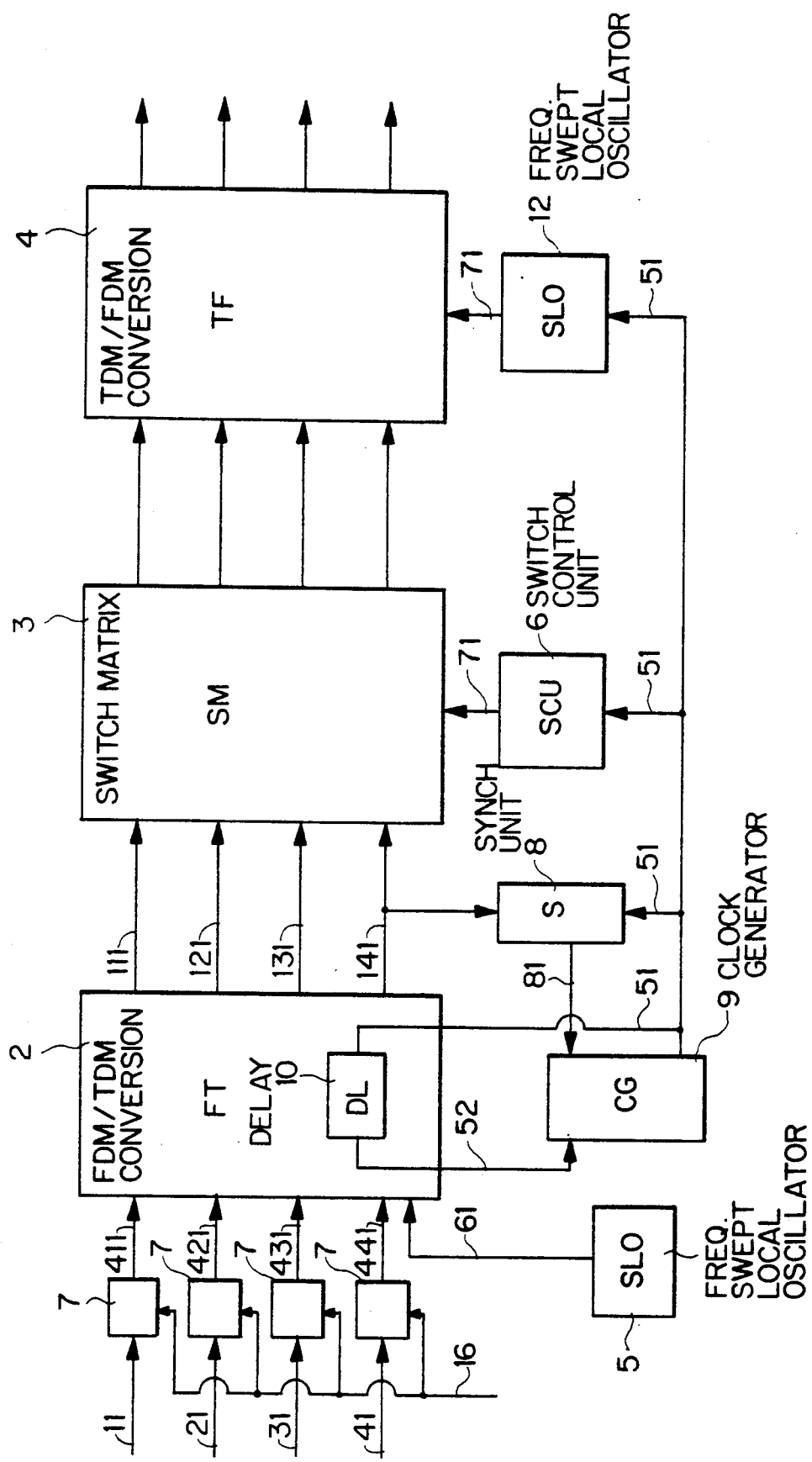

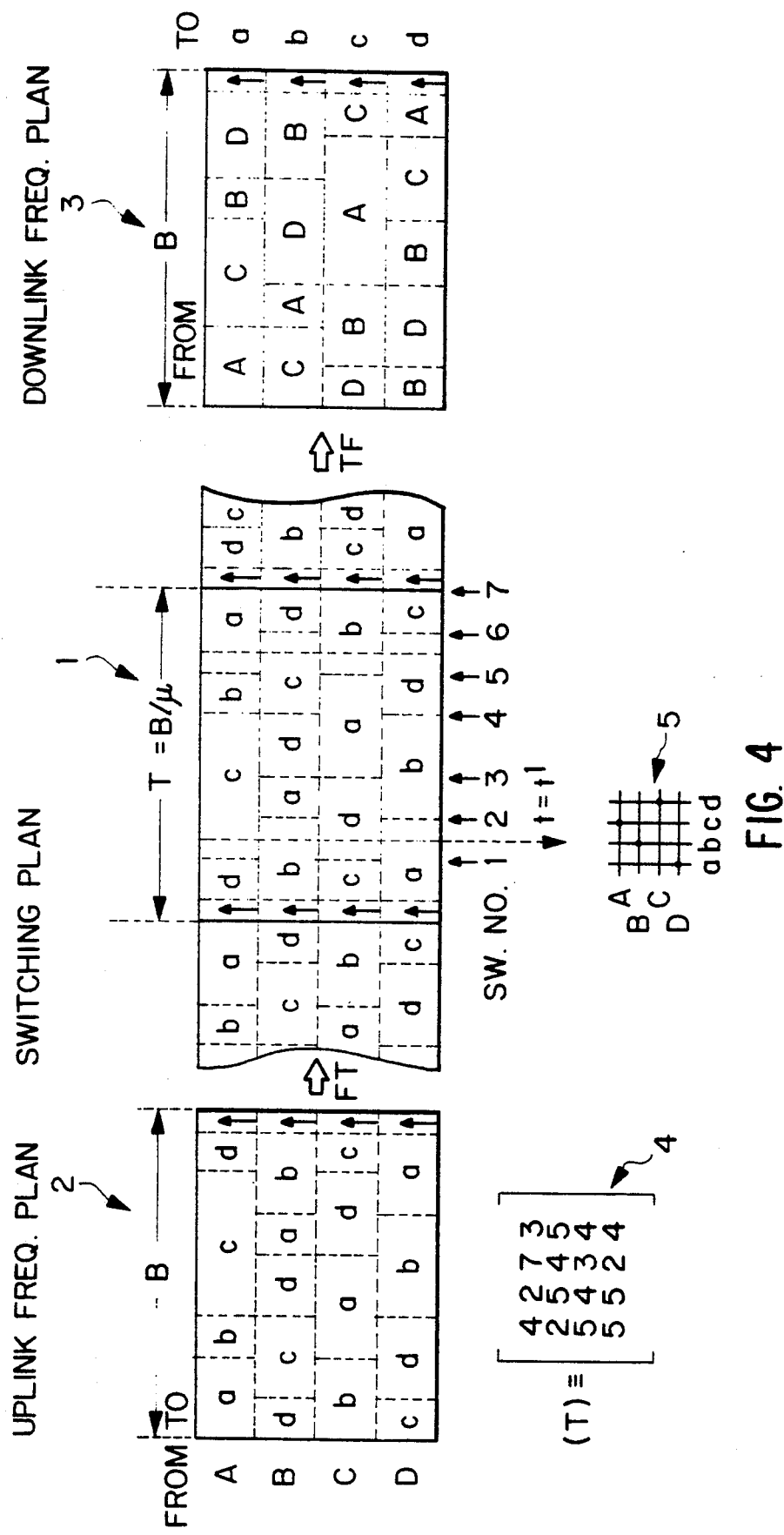

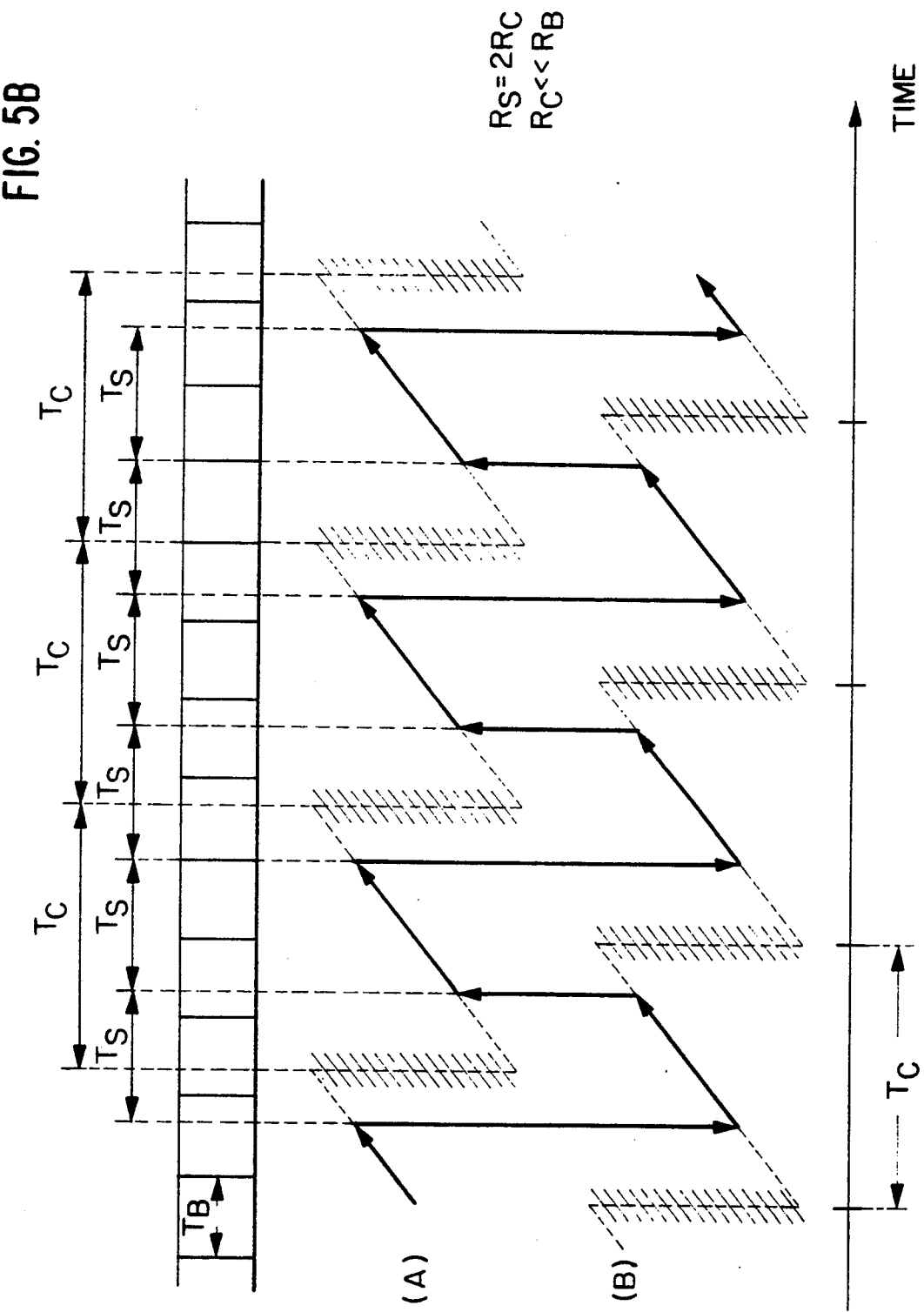

NON-REGENERATIVE MULTIBEAM SATELLITE COMMUNICATIONS SYSTEM WITH FDMA ACCESS AND SSTDM CONNECTIVITY

BACKGROUND OF THE INVENTION

Satellite communication systems with continuous wave (CW) Frequency Division Multiple Access (FDMA) signals in the uplink and CW Frequency Division Multiplexed (FDM) signals in the downlink facilitate the use of inexpensive ground terminals because i) earth terminal transmitted power is determined only by the signals at that terminal, ii) modems do not require buffers for burst mode operation, and iii) there is no need for network synchronization. The ability to transfer signals from uplink to downlink beams will be hereafter referred to as interconnectivity.

Full interconnectivity in a conventional FDMA/FDM satellite system requires $N_2$ transponder channels on board the satellite, where N is the number of non-overlapping beams. Each transponder channel originates at one of the output ports of the on-board demultiplexer and ends at the input of one of the on-board power amplifiers. FDMA/FDM connectivity can be achieved by using time domain bandpass filters which perform the following functions: i) time domain Fourier transformation of the input signals; ii) gating of the unwanted signals; and iii) inverse Fourier transformation of the gated signals (For example see: J. D. Maines, G. L. Moule, C. O. Newton and E. G. S. Paige, "A Novel SAW Variable Frequency Filter" Proc. of IEEE Ultrasonics Symposium, pp. 355-358, 1975 and P. M. Bakken, K. Grythe and A. Ronnekleiv, "The On-board FROBE SAW/Digital Signal Processor", Proc. of the 8th Intern. Conf. Digital Sat. Comms. (ICDSC-8), pp. 617-624, 24-28 April 1989, Guadeloupe). However, the use of time domain band pass filters does not change the nature of the interconnectivity, which remains in the frequency domain, and hence does not help in reducing the complexity of the on-board FDMA/FDM interconnection hardware, which still requires $N^2$ transponder channels to fully interconnect N beams. Thus, in a conventional FDMA/FDM system having a large number of beams, the required number of transponder channels is large and, consequently, the communications payload hardware on-board the satellite is necessarily complex.

To overcome this difficulty, some conventional systems use burst signals with Satellite Switched Time Division Multiple Access (SSTDMA). Such systems require only N transponder channels for full interconnectivity of N beams since interconnectivity is accomplished by routing signals at different time slots within the same transponder channel to the downlink beams. Full interconnectivity is achieved by providing at least N transponder channels, each channel having at least N time slots directed respectively to the N downlink beams.

In an SSTDMA system, adaptive allocation of capacity is carried out by changing the duration and location of the time slots. Because previously proposed FDMA/FDM multibeam satellite systems allocate capacity in the frequency domain, fully flexible capacity allocation can only be achieved by using techniques such as Variable Bandwidth Variable Center Frequency (VBVCF) demultiplexing and multiplexing (See De Santis U.S. Pat. No. 4,858,225).

Hence, it is an object of the present invention to provide a technique for on-board satellite switching incorporating desirable features of both FDMA and SSTDMA systems, such that earth terminals in a satellite system transmit and receive FDMA/FDM signals in a continuous fashion without knowing that uplink to downlink interconnectivity is provided on-board via Satellite Switched Time Division Multiplexed (SSTDM) periodic burst signals.

It is a further object of the present invention to provide a technique for on-board satellite switching of FDMA/FDM signals which is modulation transparent and allows fully flexible interconnectivity utilizing a reduced number of transponder channels.

It is a still further object of the present invention to provide a technique for on-board satellite switching of FDMA/FDM signals using analog processors operating at Radio Frequencies (RF).

SUMMARY OF THE INVENTION

The present invention pertains to satellite on-board signal processing and more particularly to a communications payload providing SSTDM connectivity in a multi-beam system with CW FDMA uplink signals and CW FDM downlink signals.

The above and other objects of the present invention are achieved by i) transforming CW FDMA uplink signals into periodic burst TDM signals (frequency domain/time domain transformation), ii) routing the TDM signals to the desired downlink beam(s) via a Switch Matrix (SM) operated in a dynamic fashion and iii) transforming the switched TDM signals into CW FDM downlink signals (Time domain/Frequency domain Transformation).

BRIEF DESCRIPTION OF THE DRAWINGS

The invention will be more clearly understood from the following description in conjunction with the accompanying drawings wherein:

FIG. 2 illustrates the operation of the FT and TF processors as shown in FIG. 1.

FIG. 3 is an illustration of the FT/SM/TF processor unit in accordance with the present invention where the effects of temperature are taken into account.

FIG. 4 illustrates how the FDMA uplink frequency plan is transformed by the FT processor into an SSTDM switching plan in accordance with the present invention.

FIG. 5B illustrates how the switching rate of the output switches of FIG. 5A is twice the signal frame rate in each individual channel of the FT/SM/TF processing unit.

DETAILED DESCRIPTION OF THE INVENTION

The present invention relies on the ability of the satellite communications payload to perform (i) Frequency/Time domain (FT) transformation of the CW FDMA uplink signals, (ii) dynamic switching of the resulting periodic burst TDM signals and (iii) Time domain/Frequency domain (TF) transformation of the switched TDM signals.

According to the present invention, the FT transformation is performed by time compression and multiplexing of the uplink FDMA signals. The TF transformation is performed by time demultiplexing and expansion of the TDM signals output from the SM. It will be recognized by those familiar with the art that the expansion of periodic burst TDM signals to reconstruct an accurate CW FDM signal is a critical operation and must be carried out in such a way as to ensure the desired communication quality.

The FT and TF transformations may be carried out by analog signal processing techniques using continuous sampling over finite time windows. (For example see: M. A. Jack, P. M. Grant and J. H. Collins, "The Theory, Design and Applications of Surface Acoustic Wave Fourier —Transform Processors" Proc. of IEEE, Vol. 68, No. 4, pp. 450–468, April, 1980). The downlink CW FDM signals are reconstructed by coherently combining the processed samples. (For example see: R. Arsenault, "Wideband Chirp—transform Adaptive Filter" Proc. of IEEE 1985 Ultrasonics Symposium, pp. 102-107).

The dynamic SM in the present invention is identical to those conventionally used on-board spacecraft supporting SS-TDMA. The dynamic SM may, for example, be implemented by an N x N crossbar matrix using a periodic switching plan which is a scaled version of the FDMA uplink frequency plan.

Figure 1:
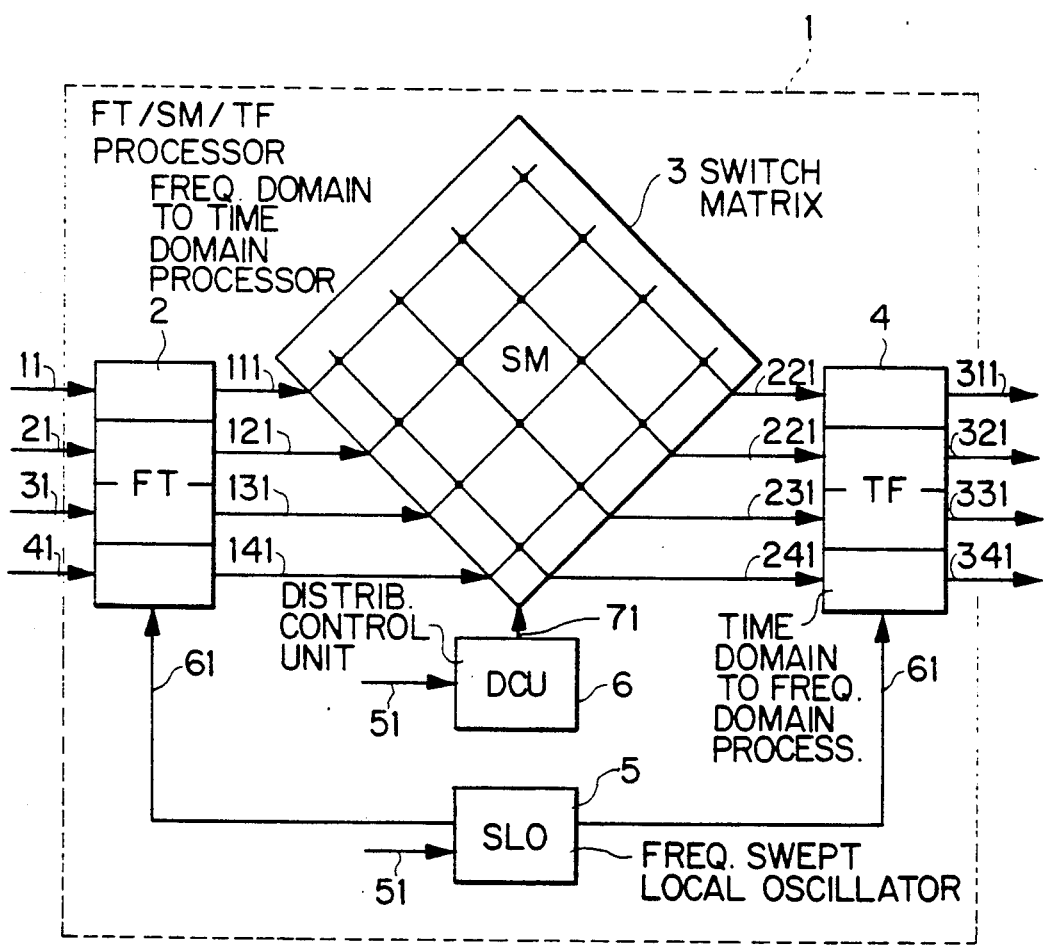
FIG. 1 is an illustration of the FT/SM/TF processor unit in accordance with the present invention.

FIG. 1 is an illustration of an FT/SM/TF processing unit in accordance with the present invention. Demultiplexed CW FDMA uplink signals (11), (21), (31) and (41) are received by the FT/SM/TF processor unit (1). The FT processor (2) transforms signals (11), (21), (31) and (41) into periodic burst TDM signals via conventional time domain sampling over a finite time window of duration $T_c$. The resultant TDM signals (111), (121), (131) and (141) corresponding respectively to signals (11), (21), (11) and (41) are applied to a switch matrix (3). The switch nodes of switch matrix (3) are switched periodically with a period equal to the TDM signal frame duration $T_c$. The switch nodes operate according to a switching plan which is a time-scaled version of the uplink frequency plan as later described in FIG. 4. Switch matrix (3) routes each frame of TDM signals (111), (121), (131) and (141) along the desired output path. TF processor (4) transforms TDM signals (211), (221), (231) and (241) output from switch matrix (3) into respective CW FDM signals (311), (321), (331) and (341) by building a sequence of time bursts expanded over a time frame equal to TDM signal frame duration $T_c$. Prior to further transmission, CW FDM signals (311), (321), (331) and (341) can be frequency translated, amplified, and/or multiplexed with other signals in a conventional manner. Synchronization of FT processor (2) with switch matrix (3) and TF processor (4) is of critical importance and may be accomplished using various conventional techniques. For example, synchronization may be accomplished by simultaneously injecting clock signals (51) into frequency swept local oscillator (5) and distribution control unit (6) which respectively generate time synchronized chirp signals (61) and switch matrix control signals (71).

FIG. 2 illustrates the operation of the FT and TF processors. A CW FDMA signal (11) with bandwidth B from frequency $f_1$ to frequency $f_2$ and consisting of four single carrier CW FDM signals (12), (13), (14) and (15) and a pilot tone signal (16) generated on-board the satellite is received by the FT processor and transformed into a periodic TDM signal (111) with a frame period $T_c = B/\mu$, where $\mu$ is a time independent constant typically expressed in MHz/$\mu$sec and established by the swept local oscillator being utilized. Each frame of TDM signal (11) contains four periodic traffic burst signals. In frame $t_1$, to $t_2$, traffic burst signals (112), (113), (114) and (115) correspond respectively to single carrier CW FDMA signals (12), (13), (14) and (15), and reference burst signal (116) corresponds to pilot tone signal (16). For each periodic traffic burst signal the amplitude envelope is a function of amplitude response of the chirp signal generated by and the value of the constant $\mu$ for the frequency swept local oscillator described in FIG. 1. In FIG. 2 different types of shadings are used to identify the carrier-burst pairs (12)/(112), (13)/(113), (14)/(114) and (15)/(115) and the tone-burst pair (16)/(116) relative to the $t_1$- $t_2$ frame. Similar pairs may be identified for each of the subsequent frames. Each frame of TDM signal (111) begins with a reference burst signal as indicated by bursts (116), (216) and (316). The time scale for each burst signal within each TDM signal frame is obtained by dividing the frequency band of the corresponding signal by $\mu$ and performing a time inversion. For example $t_2 - t_{12} = (f_{11} - f_1)/\mu$. The TF transformation is the inverse of the FT transformation.

The amplitude envelope of the burst signals may exhibit central lobes and side lobes. (For example see: T. Kohri, M. Morikura and S. Kato, "A 400 ch. SCPC signal demodulator using chirp transform and correlation detection scheme" Proc. GLOBECOM. '87, pp. 8.4.1-8.4.6, 1987). Reference burst signals will always have an amplitude envelope with a single central lobe with its peak at the center of each TDM signal frame. Conventional techniques can be used to minimize interference among sidelobes of adjacent burst signals. According to one such technique, a Kaiser-Bessel window is chosen which maximizes the amount of energy in the main lobe and depresses the sidelobe levels with respect to the peak level of the main lobe. (For example see: F. G. Harris "On the use of windows for harmonic analysis with the discrete Fourier transform." Proceedings of IEEE, Vol. 66, No. 1, pp. 51-83, January, 1978). Conventional techniques may also be used in the implementation of the FT processor to optimize the sidelobe performance of burst signals. As an example, if Surface Acoustic Wave (SAW) technologies are employed, strict control of amplitude and phase errors in the dispersive delay lines may be exercised. (See J. L. Thoss, "Improved time-sidelobe performance in SAW RAC's using laser aided phase compensation" Proc. of IEEE 1989 Ultrasonics Symposium, pp. 179-184).

FIG. 3 describes an FT/SM/TF processing unit in accordance with the present invention which is suitable for applications where temperature stability of the FT processor hardware cannot be neglected. Those familiar with the art will recognize that FIG. 3 describes only one of the conventional techniques which could be adapted to the present invention for applications where temperature stability of the FT processor is of concern. (For example see: M. D. Shaw et al "SAW chirp filter technology for satellite on-board processing applications" Int'l Jour. Sat. Comm. Vol. 7, No. 4, pp 262-282, October, 1989). In FIG. 3, a high stability pilot tone signal (16) is added to CW FDMA signals (11), (21), (31) and (41) in hybrids (7). The resultant composite signals (411), (421), (431) and (441) are transformed by FT processor (2) into corresponding periodic burst TDM signals (111), (121), (131) and (141) using chirp signals (61) generated by swept local oscillator (5). Each frame of TDM signals (111), 121), (131) and (141) is comprised of i) a reference burst signal which corresponds to the pilot tone signal (16) and is typically located at the beginning of the frame and ii) TDM traffic burst signals corresponding respectively to CW FDMA signals (11), (21), (31) and (41). Clock signal generator (9) generates clock signals (51). The periodicity of clock signals (51) is temperature adjusted in delay line (10) and the resulting adjusted clock signals (52) are used by clock signal generator (9) to adjust the periodicity of subsequent clock signals. Delay line (10) is preferably of the same material as and located in close physical proximity to the chirp filters within FT processor (2) so that the temperature of delay line (10) and the chirp filters are equal and thus the temperature effects on the periodicity of clock signals (51) and TDM signals (111), (121), (131) and (141) are the same. To ensure that clock signals (51) and the reference burst signals are synchronized, synchronization unit (8) envelope detects TDM signal (141), gates out the reference burst signals for each TDM signal frame and compares the start time of each reference burst signal with the start time of the appropriate clock signal. Should a synchronization error be detected, a signal (81) is transmitted to clock signal generator (9) and used by clock signal generator (9) to synchronize subsequent clock signals (51) with subsequent reference burst signals. Synchronization of switch matrix (3) and TF processor (4) with TDM signals (111), (121), (131) and (141) is accomplished by injecting clock signals (51) into frequency swept local oscillator (12) and switch control unit (6) which respectively generate, in a conventional manner, synchronized chirp signals (91) and switch matrix control signals (71). TDM traffic signals (111), (121), (131) and (141) are routed to the desired output channel by switch matrix (3) in accordance with switch matrix control signals (71) and transformed into CW FDM signals by FT processor (4) using chirp signals (91), in the same manner as previously described in FIG. 1. The CW FDM signals can now be frequency translated, amplified and/or multiplexed with other signals prior to further transmission.

FIG. 4 illustrates that the switching plan (1) of the switch matrix corresponds to the uplink frequency plan (2) and that via the switch matrix routing and the TF transformation, the switching plan is transformed into the desired downlink frequency plan (3). FIG. 4 considers a four beam system with 4 uplink beams A, B, C D; 4 downlink beams a, b, c, d; and a switch matrix (4) whose switching plan is expressed in arbitrary frequency bandwidth units. In this example, signals are assumed to occupy a frequency band of width B. The uplink frequency plan (2) is chosen arbitrarily such that there is no overlap among the bandwidths allocated to the various downlink beams. Switching plan (1) is a scaled and time inverted version of uplink plan (2) with a scale factor $1/\mu$ and a periodicity of $T_c$, where $T_c$ is the duration of the sampling time window and of the TDM signal frame. The switch matrix configuration at any selected time instant is easily identified by drawing a vertical line through the switching plan. For instance, at time $t=t^1$ the vertical crosses the regions Ac, Bb, Cd and Da of the switching plan and corresponds to switch matrix configuration (5). The total number of switchings required for each signal frame is readily calculated by recognizing the correspondence between time slot boundaries and matrix switching. For example, in switching plan (1) there are 7 switchings per frame. The downlink frequency plan (3) is likewise determined by uplink frequency plan (2). The bandwidths in (3) are obtained by multiplying the time slots in (1) by the scale factor $\mu$.

Figure 5A:
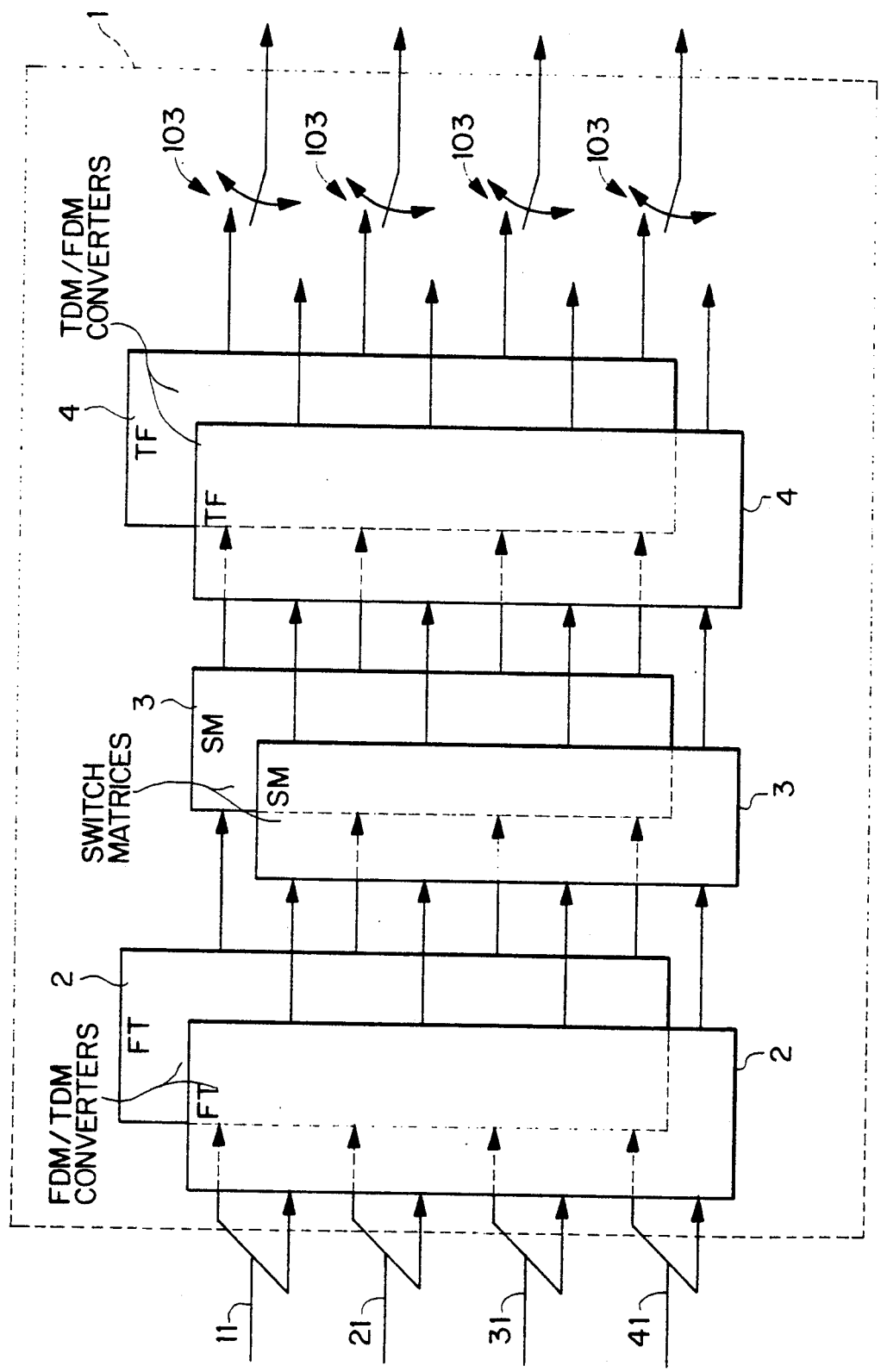
FIG. 5A is an illustration of an FT/SM/TF processing unit in accordance with the present invention which incorporates a ping-pong architecture so as to minimize errors at the signal frame transitions.

FIG. 5A shows a ping-pong architecture for the FT/SM/TF processing unit which reduces phase estimate errors at the frame transitions of multibeam signals. In a four beam system CW FDMA signals (11), (21), (31) and (41) are respectively applied to FT/SM/TF processing unit (1) via two parallel processing lines. The pair of FT processors (2), the pair of switch matrixes (3) and the pair of TF processors (4) are each equivalent to two of the corresponding components described in FIGS. 1 and 3 operating in parallel with a time offset of $0.5T_c$. Ping-pong switches (103) receive signals alternately from the two processing lines at a rate $R_S=2/T_c$ and recombine the signals sequentially in time to form a continuous signal with reduced phase estimate errors. The ability of the ping-pong architecture to reduce phase error is further described in FIG. 5B.

FIG. 5B shows a time sequence of data bits of length $T_B$. Curves (A) and (B) represent two chirp signals of period $T_c$, offset by $0.5T_c$ with respect to each other. Shaded areas represent the transition regions between two adjacent chirp signals (i.e., chirp frame transitions). Since the chirp signals and the data stream may not be synchronized and $T_c$ is not necessarily an integer multiple of $T_B$, these chirp frame transitions may fall between bit boundaries and affect the data stream. The output signals from each TF processor in FIG. 5A will display the effects of chirp frame transitions at instants of time separated by a period equal to $0.5T_c$. Thus, it will be apparent to those familiar with the art that the use of the architecture described in FIG. 5A will reduce frame transition effects.

Figure 6A:
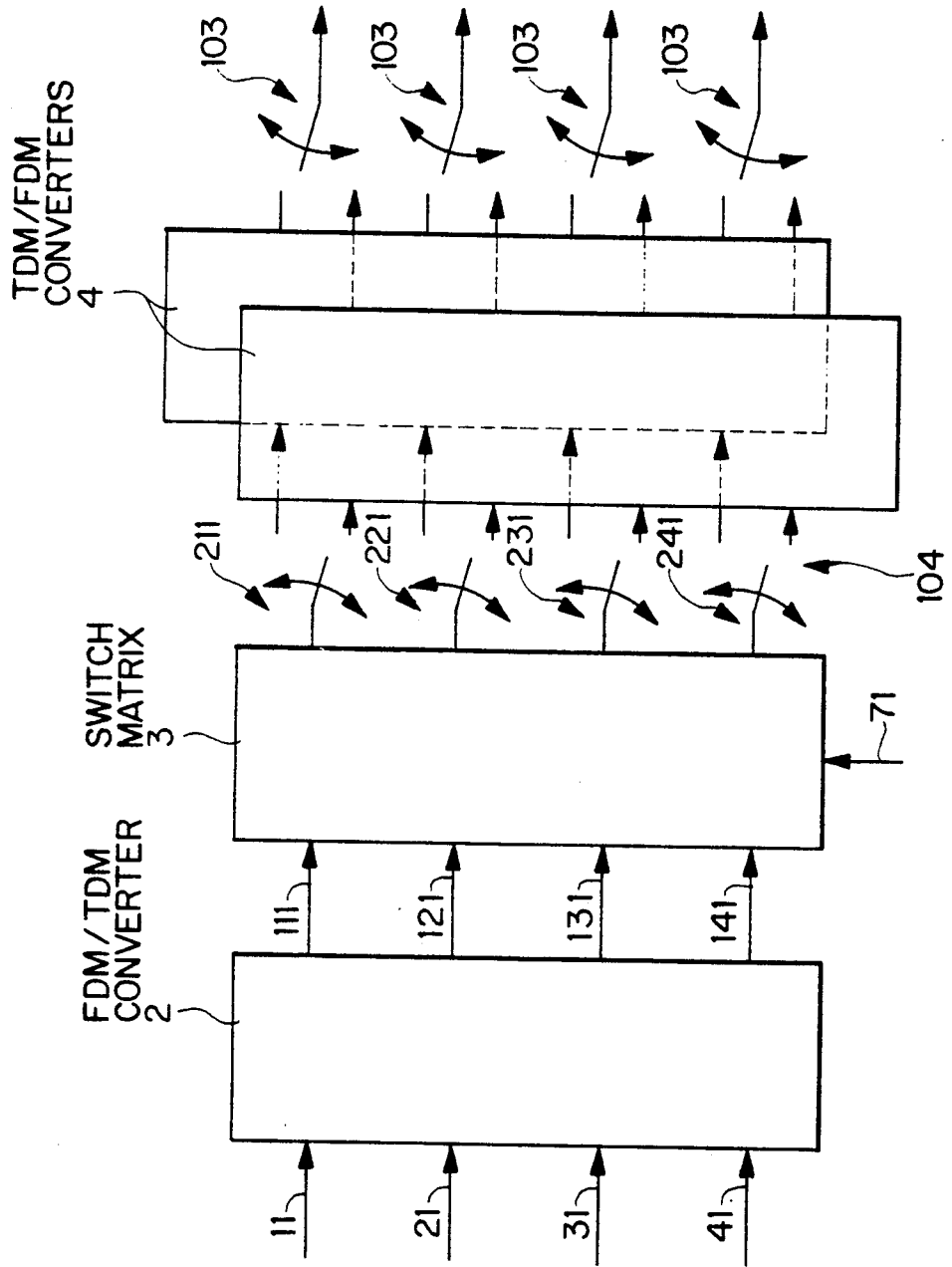
FIG. 6A is an illustration of an FT/SM/TF processing unit similar to that of FIG. 5A but with half the number of FT processors and switch matrices.

FIG. 6A shows another architecture for the FT/SM/TF processing unit which achieves the same results as the FT/SM/TF processing unit architecture described in FIG. 5A using a reduced number of FT processors and switch matrices but an increased number of output switches. Each CW FDMA signal (11), (21), (31) and (41) is multiplied by two chirp signals in the FT processor (2). Each of the two chirp signals has a periodicity equal to $T_c$ but they are time offset with respect to each other by $0.5T_c$. TDM signals (111), (121), (131) and (141) consisting of primary and redundant bursts are output from FT processor (2) with a frame period $0.5T_c$ and are switched in switch matrix (3) according to a control signal (71). The primary and redundant bursts for each of switch matrix output signals (211), (221), (231) and (241) are respectively applied by ping-pong switch (104) to TF processors (105) and (106) as further described in FIGS. 6B and 6C. The pair of TF processors (4) is equivalent to two of the TF processor described in FIG. 1 operating in parallel with a time offset of 0.5$T_c$. TF transformations of the switch matrix output signals are performed by TF processors (4) utilizing respective chirp signals which each have a periodicity equal to $T_c$ but which are time offset with respect to each other by 0.5$T_c$. Ping-pong switches (103) receive and recombine the signals from the two processing lines in the manner described in FIG. 5.

Figure 6B:
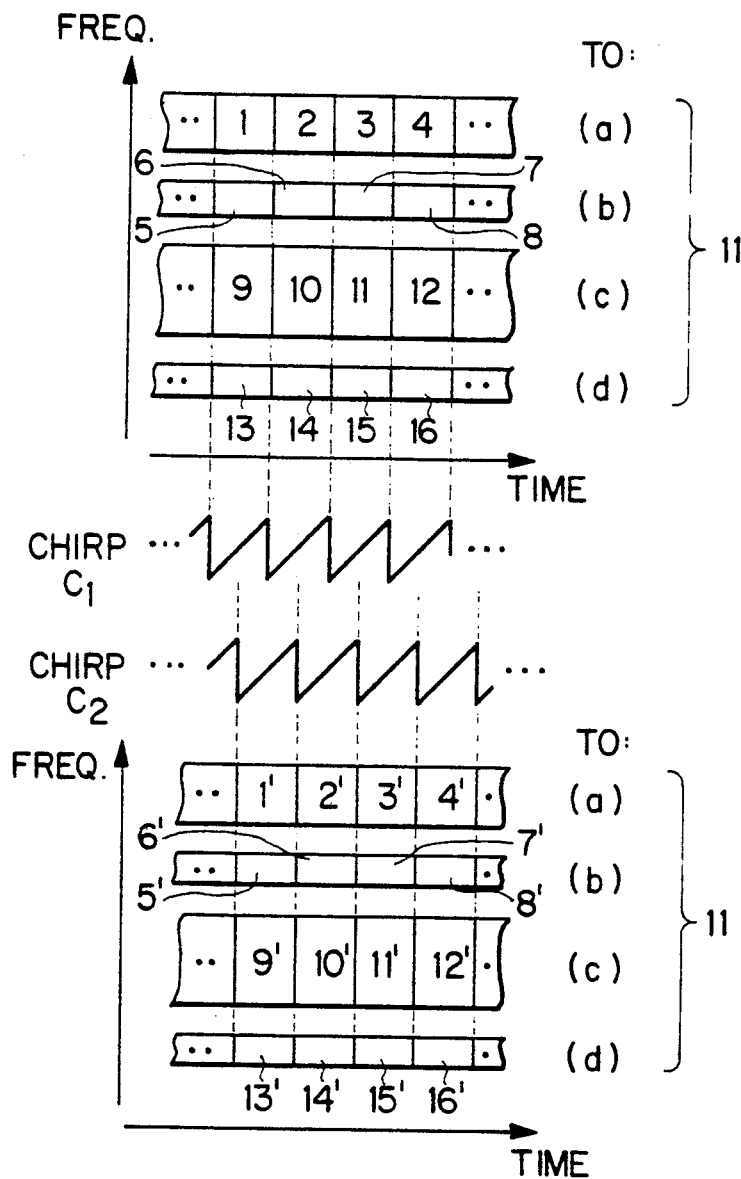
FIG. 6B and 6C together illustrate how the FT and SM processing is performed in the FT/SM/TF processing unit described in FIG. 6A.
Figure 6C:
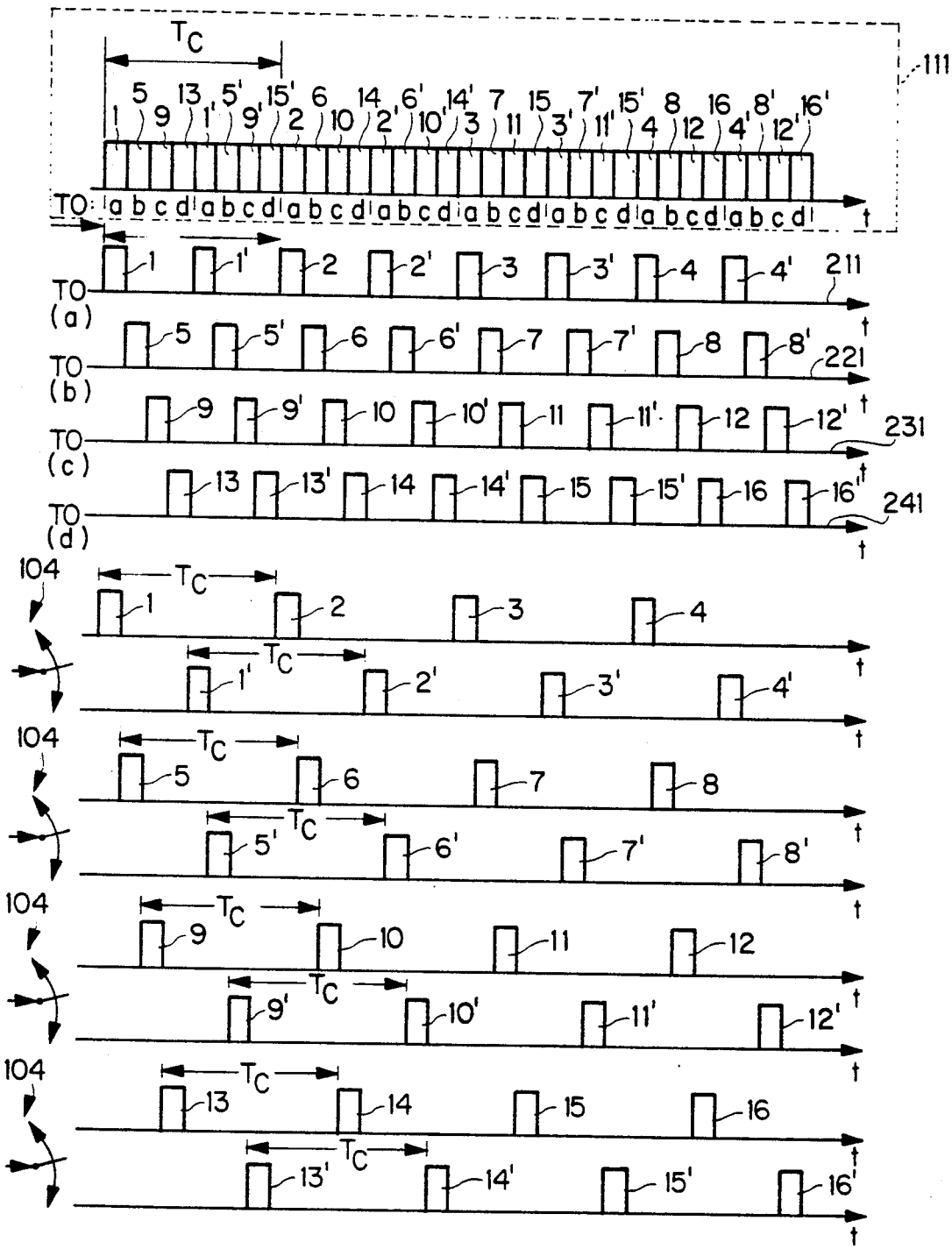

FIGS. 6B and 6C illustrate the FT/SM processing performed in the unit of FIG. 6A. FDM input signal (11) is constituted of four frequency multiplexed signals carrying data to the four output paths (a), (b), (c) and (d). Each signal handles a continuous flow of data arranged in successive time slots (numbered 1 through 16) of period $T_c$. Chirp $C_1$ transforms frequency multiplexed signal frames 1, 5, 9 and 13 into time multiplexed signal bursts 1, 5, 9 and 13 and compresses them within the time slot $t_o \leq t \leq t_o + 0.5T_c$. Chirp $C_2$ which is time shifted with respect to chirp $C_1$ by 0.5$T_c$, transforms frequency multiplexed signal frames 5, 9, and 13 into time multiplexed signal bursts 1', 5', 9' and 13' and compresses them within the time slot $t_0 + 0.5T_c \leq t \leq_o + T_c$. This process is repeated in a continuous fashion resulting in the burst signals (111). The switch matrix SM routes the burst signals (111) to the appropriate switch matrix outputs such that SM output signals (211) are routed to downlink path (a), (221) to (b), (231) to (c) and (241) to (d). Ping-pong switches (104) time demultiplex each of switch matrix output signals (211), (221), (231) and (241) into two signal streams, constituted of adjacent time bursts, which are routed along parallel downlink paths to the TF processors (4) and recombined as described in FIG. 6A.

What is claimed is:

1. In a communication system, an apparatus for providing complete interconnectivity between one or more frequency division multiplexed (FDM) input signals and plural FDM output signals, said apparatus comprising:
Frequency domain/Time domain (FT) signal processing means for transforming without demodulation each said FDM input signal into a corresponding time division multiplexed (TDM) input signal;
matrix switching means having a plurality of output transmission paths for routing each said TDM input signal to one or more of said output transmission paths; and
Time domain/Frequency domain (TF) signal processing means for transforming the TDM signal on each of said output transmission paths into a corresponding FDM output signal.

2. An apparatus as recited in claim 1, wherein each of said TDM input signals is comprised of a continuous stream of adjacent signal bursts and the location of each of said signal bursts in each TDM input signal corresponds to the location of a carrier in the corresponding FDM input signal.

3. An apparatus as recited in claim 1, wherein said matrix switching means has a switching plan and said FDM output signals have an output frequency plan which corresponds to an input frequency plan of the one or more FDM input signals.

4. An apparatus as recited in claim 1, wherein the one or more FDM input signals are received in a continuous wave.

5. An apparatus as recited in claim 1, wherein the communications system is a satellite communications network.

6. An apparatus as recited in claim 1, wherein said TDM input signals comprise time compressed TDM signals.

7. In a communications system, an apparatus for providing complete interconnectivity between one or more frequency division multiplexed (FDM) input signals and plural FDM output signals, said apparatus comprising:
first Frequency domain/Time domain (FT) signal processing means for transforming each said FDM input signal into a corresponding first time division multiplexed (TDM) input signal;
second FT signal processing means for transforming each said FDM input signal into a corresponding second TDM input signal;
first matrix switching means having a plurality or first output transmission paths for routing each said first TDM signal to one or more of said first output transmission paths;
second matrix switching means having a plurality of second output transmission paths for routing each said second TDM input signal to one or more of said second output transmission paths;
first Time domain/Frequency domain (TF) signal processing means for transforming the first TDM signal on each of said first output transmission paths into a corresponding first FDM output signal;
second TF signal processing means for transforming the second TDM signal on each of said second output transmission paths into a corresponding second FDM output signal; and
signal combining means for combining the corresponding first and second FDM output signals.

8. An apparatus as recited in claim 7, further including a source of clock signals for synchronizing said first and second FT signal processing means, matrix switching means, TF signal processing means and signal combining means and said source including temperature adjusting means for adjusting the timing of said clock signals in accordance with temperature changes in the first and second FT signal processing means.

9. An apparatus as recited in claim 7, wherein said first and second TDM input signals have different frame transition times.

10. An apparatus as recited in claim 9, wherein said frame transition times of said first and second TDM input signals are offset with respect to one another by 0.5 $T_c$, where $T_c$ is the frame duration.

11. An apparatus as recited in claim 7, wherein each said matrix switching means has a switching plan and said FDM output signals have an output frequency plan which corresponds to an input frequency plan of the one or more FDM input signals.

12. In a communication system, an apparatus for providing complete interconnectivity between one or more frequency division multiplexed (FDM) input signals and plural FDM output signals, said apparatus comprising:
Frequency domain/Tie domain (FT) signal processing means for transforming each said FDM input signal into a corresponding time division multiplexed (TDM) input signal having primary and redundant signal bursts;
matrix switching means having a plurality of output transmission paths for routing each said TDM input signal to one or more output of said transmission paths;

router means having primary and redundant output transmission paths for routing the primary signal bursts from each said output transmission path of said matrix switching means to a primary output transmission path of said router means and for routing the redundant signal bursts from said each output transmission path of said matrix switching means to a redundant output transmission path of said router means;

first Time domain/Frequency domain (TF) signal processing means for transforming the primary signal bursts on each said primary output transmission path into a corresponding first FDM output signal;

second TF signal processing means for transforming the redundant signal burst on each said redundant output transmission path into a corresponding second FDM output signal; and signal combining means for combining the corresponding first and second FDM output signals.

13. An apparatus as recited in claim 12, wherein said matrix switching means has a switching plan and said FDM output signals have an output frequency plan which corresponds to an input frequency plan of the one or more FDM input signals.

14. An apparatus as recited in claim 7 or 12, wherein said signal combining means combines each said corresponding first FDM output signal with said corresponding second FDM output signal by alternatively selecting portions of said first and corresponding second FDM output signals and combining the selected signal portions sequentially to produce a combined output signal with reduced frame transition effects.

15. An apparatus as recited in claim 2 or 3, wherein each of said TDM input signals is comprised of a continuous stream of adjacent signal bursts and the location of each of said signal bursts in each TDM input signal corresponds to the location of a carrier in the corresponding FDM input signal.

16. An apparatus as recited in claim 2 or 12, wherein the one or more FDM input signals are received in a continuous wave.

17. An apparatus as recited in claim 7 or 12, wherein the communications system is a satellite communications network.

18. An apparatus as recited in claim 7 or 12, wherein said TDM input signals comprise time compressed TDM signals.

19. In a communication system, a method for providing complete interconnectivity between one or more frequency division multiplexed (FDM) input signals and plural FDM output signals, said method comprising the steps of:

transforming without demodulation each said FDM input signal into a corresponding time division multiplexed (TDM) input signal;

routing each said TDM input signal to one or more output transmission paths; and transforming the TDM signal on each of said output transmission paths into a corresponding FDM output signal.

20. A method as recited in claim 19, wherein each of said TDM input signals is comprised of a continuous stream of adjacent signal bursts and the location of each of said signal bursts in each TDM input signal corresponds to the location of a carrier in the corresponding FDM input signal.

21. A method as recited in claim 19, wherein the routing of the one or more TDM input signals is in accordance with a routing plan and the FDM output signals have an output frequency plan and said routing plan and output frequency plan correspond to an input frequency plan of the one or more FDM input signals.

22. A method as recited in claim 19, wherein the one or more FDM input signals are received in a continuous wave.

23. A method as recited in claim 19 further including the step of synchronizing the transformation of the one or more FDM input signals, the routing of each said TDM input signal, the transformation of each said TDM signal and the combining of the FDM output signals.

24. A method as recited in claim 19, wherein the communications system is a satellite communications network.

25. A method as recited in claim 19, wherein each said TDM input signal comprises a time compressed TDM signal.

26. In a communications system, a method for providing complete interconnectivity between one or more frequency division multiplexed (FDM) input signals and plural FDM output signals, said method comprising the steps of:

transforming each said FDM input signal into a corresponding first time division multiplexed (TDM) input signal;

transforming each said FDM input signal into a corresponding second TDM input signal;

routing each said first TDM input signal to one or more first output transmission paths;

routing each said second TDM input signal to one or more second output transmission paths;

transforming the first TDM signal on each of said first output transmission paths into a corresponding first FDM output signal;

transforming the second TDM signal one each of said second output transmission paths into a corresponding second FDM output signal;

combining the corresponding first and second FDM output signals.

27. A method as recited in claim 26, further including the step of synchronizing the transformation of the one or more FDM input signals, the routing of each TDM input signal and the transformation of each TDM signal.

28. A method as recited in claim 26, wherein said first and second TDM input signals have different frame transition times.

29. A method as recited in claim 28, wherein said frame transition times of said first and second TDM input signals are offset with respect to one another by $0.5\ T_c$, where $T_c$ is the frame duration.

30. In a communications system, a method for providing complete interconnectivity between one or more frequency division multiplexed (FDM) input signals and plural FDM output signals, said method comprising the steps of:

transforming each said FDM input signal into a corresponding time division multiplexed (TDM) input signal having primary and redundant signal bursts;

routing each said TDM input signal to one or more output transmission paths;

routing the primary signal bursts from each said output transmission path to a primary output transmission path and routing the redundant signal bursts from said each output transmission path to a redundant output transmission path;

transforming the primary signal bursts on each said primary output transmission path into a corresponding second FDM output signal;

transforming the redundant signal bursts on each said redundant output transmission path into a corresponding second FDM output signal;

combining the corresponding first and second FDM output signals.

31. A method as recited in claim 26 or 30, wherein said combining step includes the steps of combining each said corresponding first FDM output signal with said corresponding second FDM output signal by alternatively selecting portions of said corresponding first and corresponding second FDM output signals and combining the selected signal portions sequentially to produce a combined output signal with reduced frame transmission effects.

32. A method as recited in claim 26 or 30, wherein each of said TDM input signals is comprised of a continuous stream of adjacent signal bursts and the location of each of said signal bursts in each TDM input signal corresponds to the location of a carrier in the corresponding FDM input signal.

33. A method as recited in claim 26 or 30, wherein the routing of the TDM input signals is in accordance with a routing plan and the FDM output signals have an output frequency plan and said routing plan and output frequency plan correspond to an input frequency plan of the one or more FDM input signals.

34. A method as recited in claim 26 or 30, wherein the one or more FDM input signals are received in a continuous wave.

35. A method as recited in claim 26 or 30, wherein the communications system is a satellite communications network.

36. A method as recited in claim 26 or 30, wherein said TDM input signals comprise time compressed TDM signals.

37. In a communications system, an apparatus for providing complete interconnectivity between one or more frequency division multiplexed (FDM) input signals and one or more FDM output signals, said apparatus comprising:

Frequency domain/Time domain (FT) signal processing means for transforming each said FDM input signals into a corresponding time division multiplexed (TDM) input signal;

matrix switching means having a plurality of output transmission paths for routing each said TDM input signal to one or more of said output transmission paths;

Time domain/Frequency domain signal processing means for transforming the TDM signal on each of said output transmission paths into a corresponding FDM output signal; and a source of clock signals for synchronizing said FT signal processing means, said matrix switching means and said TF signal processing means and said source including temperature adjusting means for adjusting the timing of said clock signals in accordance with temperature changes in the FT signal processing means.

38. In a communication system, a method for providing complete interconnectivity between plural frequency division multiplexed (FDM) input signals and one FDM output signal, said method comprising the steps of:

transforming without demodulation said FDM input signals into corresponding time division multiplexed (TDM) input signals;

routing said TDM input signals to one output transmission path; and transforming the TDM signals on said output transmission path into a corresponding FDM output signal.

* * * * *